United States Patent
Luo et al.

(10) Patent No.: US 12,547,978 B2
(45) Date of Patent: Feb. 10, 2026

(54) MACHINE LEARNING MODEL TRAINED TO PREDICT USER INTERACTIONS WITH ITEMS FOR INVENTORY ASSORTMENT

(71) Applicant: Maplebear Inc., San Francisco, CA (US)

(72) Inventors: Haochen Luo, Conroe, TX (US); Kenneth Jason Sanchez, Orange, CA (US); Eric Hermann, San Francisco, CA (US)

(73) Assignee: Maplebear Inc., San Francisco, CA (US)

( * ) Notice: Subject to any disclaimer, the term of this patent is extended or adjusted under 35 U.S.C. 154(b) by 356 days.

(21) Appl. No.: 18/141,398

(22) Filed: Apr. 29, 2023

(65) Prior Publication Data
US 2024/0362582 A1 Oct. 31, 2024

(51) Int. Cl.
*G06Q 10/087* (2023.01)

(52) U.S. Cl.
CPC ................. *G06Q 10/087* (2013.01)

(58) Field of Classification Search
CPC .................................................. G06Q 10/087
USPC ......................................................... 705/28
See application file for complete search history.

(56) References Cited

U.S. PATENT DOCUMENTS

| | | | | |
|---|---|---|---|---|
| 2022/0076164 A1* | 3/2022 | Conort | .................... | G06N 20/00 |
| 2023/0083891 A1* | 3/2023 | Achin | .................... | G06F 3/0484 |
| | | | | 715/762 |
| 2023/0091610 A1* | 3/2023 | Tamazlykar | ............. | G06N 3/08 |
| | | | | 706/11 |
| 2023/0186364 A1* | 6/2023 | Stiegler | .............. | G06Q 30/0627 |
| | | | | 705/26.63 |
| 2023/0206610 A1* | 6/2023 | Pyzow | .................. | G06V 10/776 |
| | | | | 382/157 |
| 2024/0095611 A1* | 3/2024 | Dzugan | .................... | G06N 20/20 |
| 2024/0394101 A1* | 11/2024 | Barker, Jr. | ............ | G06F 3/0664 |

FOREIGN PATENT DOCUMENTS

WO WO-2022240860 A1 * 11/2022 ............. G06N 20/00

* cited by examiner

*Primary Examiner* — Russell S Glass
(74) *Attorney, Agent, or Firm* — Fenwick & West LLP

(57) ABSTRACT

An inventory interaction model predicts user interactions with items to be included in an item assortment in a warehouse. The item is described with features that include the co-located items and the respective user interactions, so that the item interactions for the evaluated item incorporate item-item effects in its predictions. To train the model effectively in the absence of prior interaction data for an item, training examples are generated from existing item and user interaction data of co-located items by selecting a portion of the items for the examples and including co-located item data, labeling the training example output with item interactions for the item. The trained model is then applied for an item assortment by describing co-located item features of the item assortment in evaluating candidate items.

18 Claims, 7 Drawing Sheets

MACHINE LEARNING MODEL TRAINED TO PREDICT USER INTERACTIONS WITH ITEMS FOR INVENTORY ASSORTMENT

BACKGROUND

Online concierge systems may facilitate ordering and item fulfillment for users from local physical warehouses. Determining which items to stock for such warehouses may be a challenging task, particularly when the warehouses are reliant on orders through the online concierge system to consume item stock in a timely manner. Warehouses are limited in physical space available to stock items, and each item may both occupy different amounts of space and have different expected demand based on various factors, including any other items that may be stocked with an item. That is, considering an item to add to a warehouse may be affected by the other co-located items in the warehouse and the total assortment of items available.

Computer modeling for predicting expected user interactions may struggle to effectively predict item-item effects (e.g., the effects of one item on another) for a new item, especially for items without prior interaction histories, because there is little or no training data to train such models. In addition, while historic user interactions may be available for already-stocked items, it may be difficult to train a machine-learning model to successfully predict user interactions with items for which there is no prior history, and furthermore to do so with consideration of the other items that may be available at a warehouse.

SUMMARY

In accordance with one or more aspects of the disclosure, training data for a machine-learning model performing inventory interaction prediction is generated based on a set of items having user interaction data, which may represent the inventory of a warehouse and the historical user interactions with these items. The machine-learning model may predict user interactions for an item, given features of the item, along with features of co-located items, which may include user interaction information for the co-located items. To train the model to successfully predict interactions of users with items that are not yet stocked, while benefiting from co-stocked items and their related user interactions, a portion of the set of items (i.e., a subset of the items) is selected to be training examples for the model. For the selected items, training examples are generated by considering the other items of the set as the co-located items for generation of the co-located item features. The training examples may then be labeled with known user interactions of the items and used to train the model predictions. In using co-located item features in conjunction with actual historical data, a portion of the items may be set aside (e.g., for validation of the trained model) and training data may be generated based on the remaining items, including generation of co-located item information (which may exclude information for the set-aside items). For example, data may be available for 100 items currently stocked in a warehouse, with historical user interactions describing a frequency that users included the respective items in an order from the online concierge system. To generate training data, ten items may be selected to be set aside as holdouts and the remaining ninety items may be used to form training examples in which each training item may include co-located item features based on the other training items. The training examples may then be labeled with each item's respective user interactions as the output for the model to learn to predict. The trained model may then be applied to the set-aside items to generate a validation score of the trained model. In some embodiments, the process may be repeated to generate training examples with different subsets of the overall set of items (i.e., different items set aside, and other items used to generate training examples). This may permit evaluation of models based on the validation scores, including evaluating different models against one another to select an optimal model structure for application or further training.

The machine-learning model may thus be trained with the training examples to learn parameters for predicting user interactions for items with consideration of co-located items and their interactions while permitting validation of the results. This provides an effective way for the machine-learning model to simulate the addition of items to an existing item assortment, particularly in the absence of user interaction data for the items to be added and with limited historical data for co-located items. The machine-learning model may be applied to a new content item to predict user interactions and evaluate addition of the item to the warehouse assortment. The predicted user interactions for various candidate items may then be used to score the items and select additions to the warehouse. The scoring may include consideration of additional factors, such as the additional space requirements for the item, required storage conditions, spoilage, and so forth. In some embodiments, several items may be scored and ranked to select several items for addition to the warehouse. In additional or alternative embodiments, the additional items may be determined iteratively, such that, for subsequent items after the first, the set of "co-located" items may include the previously-added candidate items with the predicted interactions for those items, such that further item-item interactions for co-located items are considered in the addition of further items.

DETAILED DESCRIPTION

Figure 1:
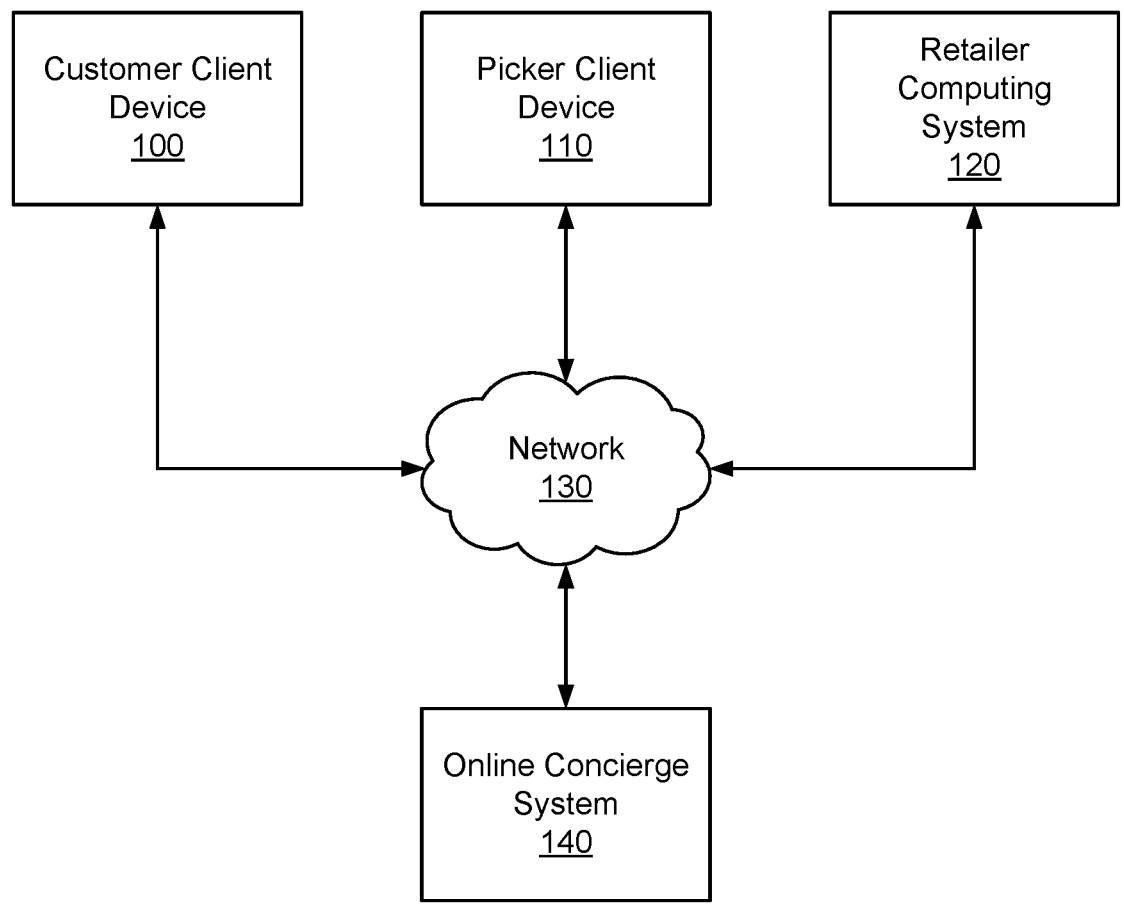
FIG. 1 illustrates an example system environment for an online concierge system, in accordance with one or more embodiments.

FIG. 1 illustrates an example system environment for an online concierge system 140, in accordance with one or more embodiments. The system environment illustrated in FIG. 1 includes a customer client device 100, a picker client device 110, a retailer computing system 120, a network 130, and an online concierge system 140. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

As used herein, customers, pickers, and retailers may be generically referred to as "users" of the online concierge system 140. Additionally, while one customer client device 100, picker client device 110, and retailer computing system 120 are illustrated in FIG. 1, any number of customers, pickers, and retailers may interact with the online concierge system 140. As such, there may be more than one customer client device 100, picker client device 110, or retailer computing system 120.

The customer client device 100 is a client device through which a customer may interact with the picker client device 110, the retailer computing system 120, or the online concierge system 140. The customer client device 100 can be a personal or mobile computing device, such as a smartphone, a tablet, a laptop computer, or desktop computer. In some embodiments, the customer client device 100 executes a client application that uses an application programming interface (API) to communicate with the online concierge system 140.

A customer uses the customer client device 100 to place an order with the online concierge system 140. An order specifies a set of items to be delivered to the customer. An "item," as used herein, means a good or product that can be provided to the customer through the online concierge system 140. The order may include item identifiers (e.g., a stock keeping unit (SKU) or a price look-up code) for items to be delivered to the user and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

The customer client device 100 presents an ordering interface to the customer. The ordering interface is a user interface that the customer can use to place an order with the online concierge system 140. The ordering interface may be part of a client application operating on the customer client device 100. The ordering interface allows the customer to search for items that are available through the online concierge system 140 and the customer can select which items to add to a "shopping list." A "shopping list," as used herein, is a tentative set of items that the user has selected for an order but that has not yet been finalized for an order. The ordering interface allows a customer to update the shopping list, e.g., by changing the quantity of items, adding or removing items, or adding instructions for items that specify how the item should be collected.

The customer client device 100 may receive additional content from the online concierge system 140 to present to a customer. For example, the customer client device 100 may receive coupons, recipes, or item suggestions. The customer client device 100 may present the received additional content to the customer as the customer uses the customer client device 100 to place an order (e.g., as part of the ordering interface).

Additionally, the customer client device 100 includes a communication interface that allows the customer to communicate with a picker that is servicing the customer's order. This communication interface allows the user to input a text-based message to transmit to the picker client device 110 via the network 130. The picker client device 110 receives the message from the customer client device 100 and presents the message to the picker. The picker client device 110 also includes a communication interface that allows the picker to communicate with the customer. The picker client device 110 transmits a message provided by the picker to the customer client device 100 via the network 130. In some embodiments, messages sent between the customer client device 100 and the picker client device 110 are transmitted through the online concierge system 140. In addition to text messages, the communication interfaces of the customer client device 100 and the picker client device 110 may allow the customer and the picker to communicate through audio or video communications, such as a phone call, a voice-over-IP call, or a video call.

The picker client device 110 is a client device through which a picker may interact with the customer client device 100, the retailer computing system 120, or the online concierge system 140. The picker client device 110 can be a personal or mobile computing device, such as a smartphone, a tablet, a laptop computer, or desktop computer. In some embodiments, the picker client device 110 executes a client application that uses an application programming interface (API) to communicate with the online concierge system 140.

The picker client device 110 receives orders from the online concierge system 140 for the picker to service. A picker services an order by collecting the items listed in the order from a retailer. The picker client device 110 presents the items that are included in the customer's order to the picker in a collection interface. The collection interface is a user interface that provides information to the picker on which items to collect for a customer's order and the quantities of the items. In some embodiments, the collection interface provides multiple orders from multiple customers for the picker to service at the same time from the same retailer location. The collection interface further presents instructions that the customer may have included related to the collection of items in the order. Additionally, the collection interface may present a location of each item at the retailer, and may even specify a sequence in which the picker should collect the items for improved efficiency in collecting items. In some embodiments, the picker client device 110 transmits to the online concierge system 140 or the customer client device 100 which items the picker has collected in real time as the picker collects the items.

The picker can use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online concierge system 140. Furthermore, the picker client device 110 determines a weight for items that are priced by weight. The picker client device 110 may prompt the picker to manually input the weight of an item or may communicate with a weighing system in the retailer location to receive the weight of an item.

When the picker has collected all of the items for an order, the picker client device 110 instructs a picker on where to deliver the items for a customer's order. For example, the picker client device 110 displays a delivery location from the order to the picker. The picker client device 110 also provides navigation instructions for the picker to travel from the retailer location to the delivery location. When a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online concierge system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online concierge system 140. The online concierge system 140 may transmit the location data to the customer client device 100 for display to the customer, such that the customer can keep track of when their order will be delivered. Additionally, the online concierge system 140 may generate updated navigation instructions for the picker based on the picker's location. For example, if the picker takes a wrong turn while traveling to a delivery location, the online concierge system 140 determines the picker's updated location based on location data from the picker client device 110 and generates updated navigation instructions for the picker based on the updated location.

In one or more embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online concierge system 140.

Additionally, while the description herein may primarily refer to pickers as humans, in some embodiments, some or all of the steps taken by the picker may be automated. For example, a semi- or fully-autonomous robot may collect items in a retailer location for an order and an autonomous vehicle may deliver an order to a customer from a retailer location.

The retailer computing system 120 is a computing system operated by a retailer that interacts with the online concierge system 140. As used herein, a "retailer" is an entity that operates a "retailer location," which is a store, warehouse, or other building from which a picker can collect items. The retailer computing system 120 stores and provides item data to the online concierge system 140 and may regularly update the online concierge system 140 with updated item data. For example, the retailer computing system 120 provides item data indicating which items are available at a particular retailer location and the quantities of those items. Additionally, the retailer computing system 120 may transmit updated item data to the online concierge system 140 when an item is no longer available at the retailer location. Additionally, the retailer computing system 120 may provide the online concierge system 140 with updated item prices, sales, or availabilities. Additionally, the retailer computing system 120 may receive payment information from the online concierge system 140 for orders serviced by the online concierge system 140. Alternatively, the retailer computing system 120 may provide payment to the online concierge system 140 for some portion of the overall cost of a user's order (e.g., as a commission).

The customer client device 100, the picker client device 110, the retailer computing system 120, and the online concierge system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of the standard layers used to describe a physical or virtual network, such as the physical layer, the data link layer, the network layer, the transport layer, the session layer, the presentation layer, and the application layer. The network 130 may include physical media for communicating data from one computing device to another computing device, such as multiprotocol label switching (MPLS) lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online concierge system 140 is an online system by which customers can order items to be provided to them by a picker from a retailer. The online concierge system 140 receives orders from a customer client device 100 through the network 130. The online concierge system 140 selects a picker to service the customer's order and transmits the order to a picker client device 110 associated with the picker. The picker collects the ordered items from a retailer location and delivers the ordered items to the customer. The online concierge system 140 may charge a customer for the order and provides portions of the payment from the customer to the picker and the retailer.

As an example, the online concierge system 140 may allow a customer to order groceries from a grocery store retailer. The customer's order may specify which groceries they want delivered from the grocery store and the quantities of each of the groceries. The customer's client device 100 transmits the customer's order to the online concierge system 140 and the online concierge system 140 selects a picker to travel to the grocery store retailer location to collect the groceries ordered by the customer. Once the picker has collected the groceries ordered by the customer, the picker delivers the groceries to a location transmitted to the picker client device 110 by the online concierge system 140. The online concierge system 140 is described in further detail below with regards to FIG. 2.

Figure 2:
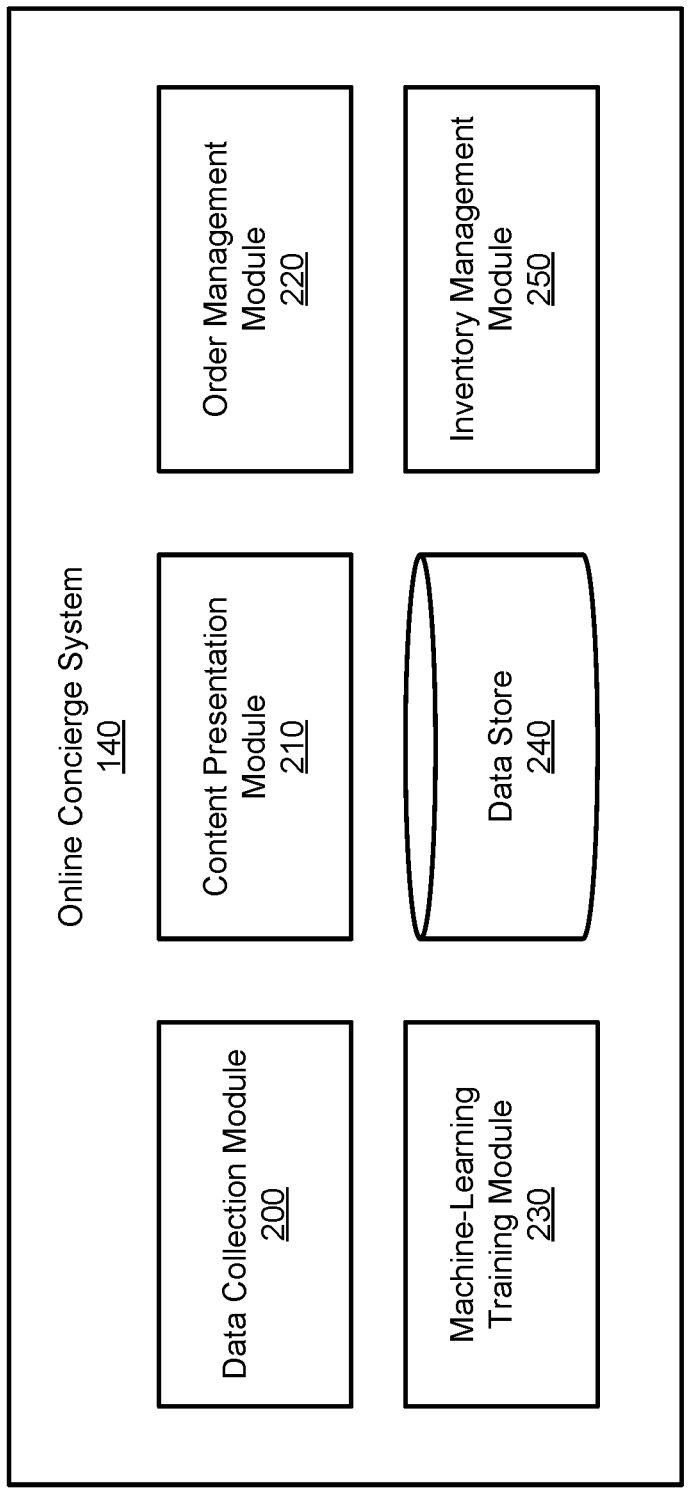
FIG. 2 illustrates an example system architecture for an online concierge system, in accordance with one or more embodiments.

FIG. 2 illustrates an example system architecture for an online concierge system 140, in accordance with some embodiments. The system architecture illustrated in FIG. 2 includes a data collection module 200, a content presentation module 210, an order management module 220, a machine-learning training module 230, a data store 240, and an inventory management module 250. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online concierge system 140 and stores the data in the data store 240. The data collection module 200 may only collect data describing a user if the user has previously explicitly consented to the online concierge system 140 collecting data describing the user. Additionally, the data collection module 200 may encrypt all data, including sensitive or personal data, describing users.

For example, the data collection module 200 collects customer data, which is information or data that describe characteristics of a customer. Customer data may include a customer's name, address, shopping preferences, favorite items, or stored payment instruments. The customer data also may include default settings established by the customer, such as a default retailer/retailer location, payment instrument, delivery location, or delivery timeframe. The data collection module 200 may collect the customer data from sensors on the customer client device 100 or based on the customer's interactions with the online concierge system 140.

The data collection module 200 also collects item data, which is information or data that identifies and describes items that are available at a retailer location. The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the availability of items in retailer locations. For example, for each item-retailer combination (a particular item at a particular warehouse), the item data may include a time that the item was last found, a time that the item was last not found (a picker looked for the item but could not find it), the rate at which the item is found, or the popularity of the item. The data collection module 200 may collect item data from a retailer computing system 120, a picker client device 110, or the customer client device 100.

An item category is a set of items that are a similar type of item. Items in an item category may be considered to be equivalent to each other or that may be replacements for each other in an order. For example, different brands of sourdough bread may be different items, but these items may be in a "sourdough bread" item category. The item categories may be human-generated and human-populated with items. The item categories also may be generated automatically by the online concierge system 140 (e.g., using a clustering algorithm).

The data collection module 200 also collects picker data, which is information or data that describes characteristics of pickers. For example, the picker data for a picker may include the picker's name, the picker's location, how often the picker has serviced orders for the online concierge system 140, a customer rating for the picker, which retailers the picker has collected items at, or the picker's previous shopping history. Additionally, the picker data may include preferences expressed by the picker, such as their preferred retailers to collect items at, how far they are willing to travel to deliver items to a customer, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online concierge system 140.

Additionally, the data collection module 200 collects order data, which is information or data that describes characteristics of an order. For example, order data may include item data for items that are included in the order, a delivery location for the order, a customer associated with the order, a retailer location from which the customer wants the ordered items collected, or a timeframe within which the customer wants the order delivered. Order data may further include information describing how the order was serviced, such as which picker serviced the order, when the order was delivered, or a rating that the customer gave the delivery of the order. In some embodiments, the order data includes user data for users associated with the order, such as customer data for a customer who placed the order or picker data for a picker who serviced the order.

The content presentation module 210 selects content for presentation to a customer. For example, the content presentation module 210 selects which items to present to a customer while the customer is placing an order. The content presentation module 210 generates and transmits an ordering interface for the customer to order items. The content presentation module 210 populates the ordering interface with items that the customer may select for adding to their order. In some embodiments, the content presentation module 210 presents a catalog of all items that are available to the customer, which the customer can browse to select items to order. The content presentation module 210 also may identify items that the customer is most likely to order and present those items to the customer. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a customer. An item selection model is a machine-learning model that is trained to score items for a customer based on item data for the items and customer data for the customer. For example, the item selection model may be trained to determine a likelihood that the customer will order the item. In some embodiments, the item selection model uses item embeddings describing items and customer embeddings describing customers to score items. These item embeddings and customer embeddings may be generated by separate machine-learning models and may be stored in the data store 240.

In some embodiments, the content presentation module 210 scores items based on a search query received from the customer client device 100. A search query is free text for a word or set of words that indicate items of interest to the customer. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a customer (e.g., by comparing a search query embedding to an item embedding).

In some embodiments, the content presentation module 210 scores items based on a predicted availability of an item. The content presentation module 210 may use an availability model to predict the availability of an item. An availability model is a machine-learning model that is trained to predict the availability of an item at a particular retailer location. For example, the availability model may be trained to predict a likelihood that an item is available at a retailer location or may predict an estimated number of items that are available at a retailer location. The content presentation module 210 may weight the score for an item based on the predicted availability of the item. Alternatively, the content presentation module 210 may filter out items from presentation to a customer based on whether the predicted availability of the item exceeds a threshold.

The order management module 220 that manages orders for items from customers. The order management module 220 receives orders from a customer client device 100 and assigns the orders to pickers for service based on picker data. For example, the order management module 220 assigns an order to a picker based on the picker's location and the location of the retailer from which the ordered items are to be collected. The order management module 220 may also assign an order to a picker based on how many items are in the order, a vehicle operated by the picker, the delivery location, the picker's preferences on how far to travel to deliver an order, the picker's ratings by customers, or how often a picker agrees to service an order.

In some embodiments, the order management module 220 determines when to assign an order to a picker based on a delivery timeframe requested by the customer with the order. The order management module 220 computes an estimated amount of time that it would take for a picker to collect the items for an order and deliver the ordered items to the delivery location for the order. The order management module 220 assigns the order to a picker at a time such that, if the picker immediately services the order, the picker is likely to deliver the order at a time within the requested timeframe. Thus, when the order management module 220 receives an order, the order management module 220 may delay in assigning the order to a picker if the requested timeframe is far enough in the future (i.e., the picker may be assigned at a later time and is still predicted to meet the requested timeframe).

When the order management module 220 assigns an order to a picker, the order management module 220 transmits the order to the picker client device 110 associated with the picker. The order management module 220 may also transmit navigation instructions from the picker's current location to the retailer location associated with the order. If the order includes items to collect from multiple retailer locations, the order management module 220 identifies the retailer locations to the picker and may also specify a sequence in which the picker should visit the retailer locations.

The order management module 220 may track the location of the picker through the picker client device 110 to determine when the picker arrives at the retailer location. When the picker arrives at the retailer location, the order management module 220 transmits the order to the picker client device 110 for display to the picker. As the picker uses the picker client device 110 to collect items at the retailer location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the customer client device 100 that describe which items have been collected for the customer's order.

In some embodiments, the order management module 220 tracks the location of the picker within the retailer location. The order management module 220 uses sensor data from the picker client device 110 or from sensors in the retailer location to determine the location of the picker in the retailer location. The order management module 220 may transmit, to the picker client device 110, instructions to display a map of the retailer location indicating where in the retailer location the picker is located. Additionally, the order management module 220 may instruct the picker client device 110 to display the locations of items for the picker to collect, and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the retailer location to the delivery location, or to a subsequent retailer location for further item collection. The order management module 220 tracks the location of the picker as the picker travels to the delivery location for an order and updates the customer with the location of the picker so that the customer can track the progress of the order. In some embodiments, the order management module 220 computes an estimated time of arrival of the picker to the delivery location and provides the estimated time of arrival to the customer.

In some embodiments, the order management module 220 facilitates communication between the customer client device 100 and the picker client device 110. As noted above, a customer may use a customer client device 100 to send a message to the picker client device 110. The order management module 220 receives the message from the customer client device 100 and transmits the message to the picker client device 110 for presentation to the picker. The picker may use the picker client device 110 to send a message to the customer client device 100 in a similar manner.

The order management module 220 coordinates payment by the customer for the order. The order management module 220 uses payment information provided by the customer (e.g., a credit card number or a bank account) to receive payment for the order. In some embodiments, the order management module 220 stores the payment information for use in subsequent orders by the customer. The order management module 220 computes a total cost for the order and charges the customer that cost. The order management module 220 may provide a portion of the total cost to the picker for servicing the order, and another portion of the total cost to the retailer.

The machine-learning training module 230 trains machine-learning models used by the online concierge system 140. The online concierge system 140 may use machine-learning models to perform functionalities described herein. Example machine-learning models include regression models, support vector machines, naïve bayes, decision trees, k nearest neighbors, random forest, boosting algorithms, k-means, hierarchical clustering, and neural networks. Additional examples also include perceptrons, multilayer perceptrons (MLP), convolutional neural networks, recurrent neural networks, sequence-to-sequence models, generative adversarial networks, and transformers. Machine-learning models may include components relating to these different general categories of model, which may be sequenced, layered, or otherwise combined in various configurations.

Each machine-learning model includes a set of parameters. The set of parameters for a machine-learning model are used to process an input and generate an output. For example, a set of parameters for a linear regression model may include weights that are applied to each input variable in the linear combination that comprises the linear regression model. Similarly, the set of parameters for a neural network may include the respective weights and biases that are applied at each neuron in the neural network. The machine-learning training module 230 generates the set of parameters (e.g., the particular values of the parameters) for a machine-learning model by "training" the machine-learning model. Once trained, the machine-learning model uses the set of parameters to transform inputs into outputs.

The machine-learning training module 230 trains a machine-learning model based on a set of training examples. Each training example includes a set of input data for which machine-learning model generates an output. For example, each training example may include customer data, picker data, item data, or order data. In some cases, the training examples also include a label which represents an expected output (i.e., a desired or intended output) of the machine-learning model. In these cases, the machine-learning model is trained by comparing its output from input data of a training example to the label for the training example. In general, during training with labeled data, the set of parameters of the model may be set or adjusted to reduce a difference between the output for the training example (given the current parameters of the model) and the label for the training example.

The machine-learning training module 230 may apply an iterative process to train a machine-learning model, whereby the machine-learning training module 230 updates parameters of the machine-learning model based on each of the sets of training examples. The training examples may be processed together, individually, or in batches. To train a machine-learning model based on a training example, the machine-learning training module 230 applies the machine-learning model to the input data in the training example to generate an output with a current set of parameters. The machine-learning training module 230 scores the output from the machine-learning model using a loss function. A loss function is a function that generates a score for the output of the machine-learning model, such that the score is higher when the machine-learning model performs poorly and lower when the machine learning model performs well. In cases where the training example includes a label, the loss function is also based on the label for the training example. Example loss functions include the mean square error function, the mean absolute error, hinge loss function, and the cross-entropy loss function. The machine-learning training module 230 updates the set of parameters for the machine-learning model based on the score generated by the loss function. For example, the machine-learning training module 230 may apply gradient descent to update the set of parameters.

The data store 240 stores data used by the online concierge system 140. For example, the data store 240 stores customer data, item data, order data, and picker data for use by the online concierge system 140. The data store 240 also stores trained machine-learning models trained by the machine-learning training module 230. For example, the data store 240 may store the set of parameters for a trained machine-learning model on one or more non-transitory computer-readable media. The data store 240 uses computer-readable media to store data, and may use databases to organize the stored data.

The inventory management module 250 provides inventory management information to retailers and may be used in the management of inventory for physical retailer locations and/or warehouses. Though shown as a component of the online concierge system 140 in FIG. 2, in some embodiments, aspects of the inventory management module 250 may be incorporated in systems used by the retailer in managing physical warehouses/locations that stock items available for purchase and/or for orders coordinated by the online concierge system 140. Each location in which items are stored may have a limited amount of space available and be capable of storing different types of items. For grocery retailers as an example, in addition to different geographical locations, different grocery retailers may have different floorspace available for stocking items, may have different departments or capacities for stocking different items (e.g., one grocer may have no area for frozen items, while another has an extensive freezer section), may have different clienteles, and so forth. The inventory management module 250 may analyze user interactions, orders, and items to determine predictions for managing inventory at these physical locations. The inventory management module 250 in various embodiments may provide information relating to warehouse locations, items to stock at these locations and at what quantities, and so forth, to optimize various metrics of the online concierge system 140 and of an operator of the warehouse locations.

As one of these functions, the inventory management module 250 recommends items to be included in a physical warehouse, such as a retailer's physical location. The collection of items included in the warehouse may also be referred to as the "item assortment" at the warehouse. Determining which items to add or remove from an item assortment may be particularly challenging both a) because the purchase of a particular item may be affected by other items in the item assortment and b) because predictions of user interactions with an item (e.g., a frequency that users add the item to an order) may lack effective training data for items that are not currently part of the item assortment. To provide effective modeling of user interactions with an item while considering the item assortment, the inventory management module 250 trains an inventory interaction model that effectively predicts user interactions for a target item (e.g., a candidate item for addition to an assortment) based on information about the item along with other items in the assortment (e.g., co-located items in the warehouse). An example structure, training, and application of the inventory interaction model are discussed below with respect to the following figures.

Figure 3:
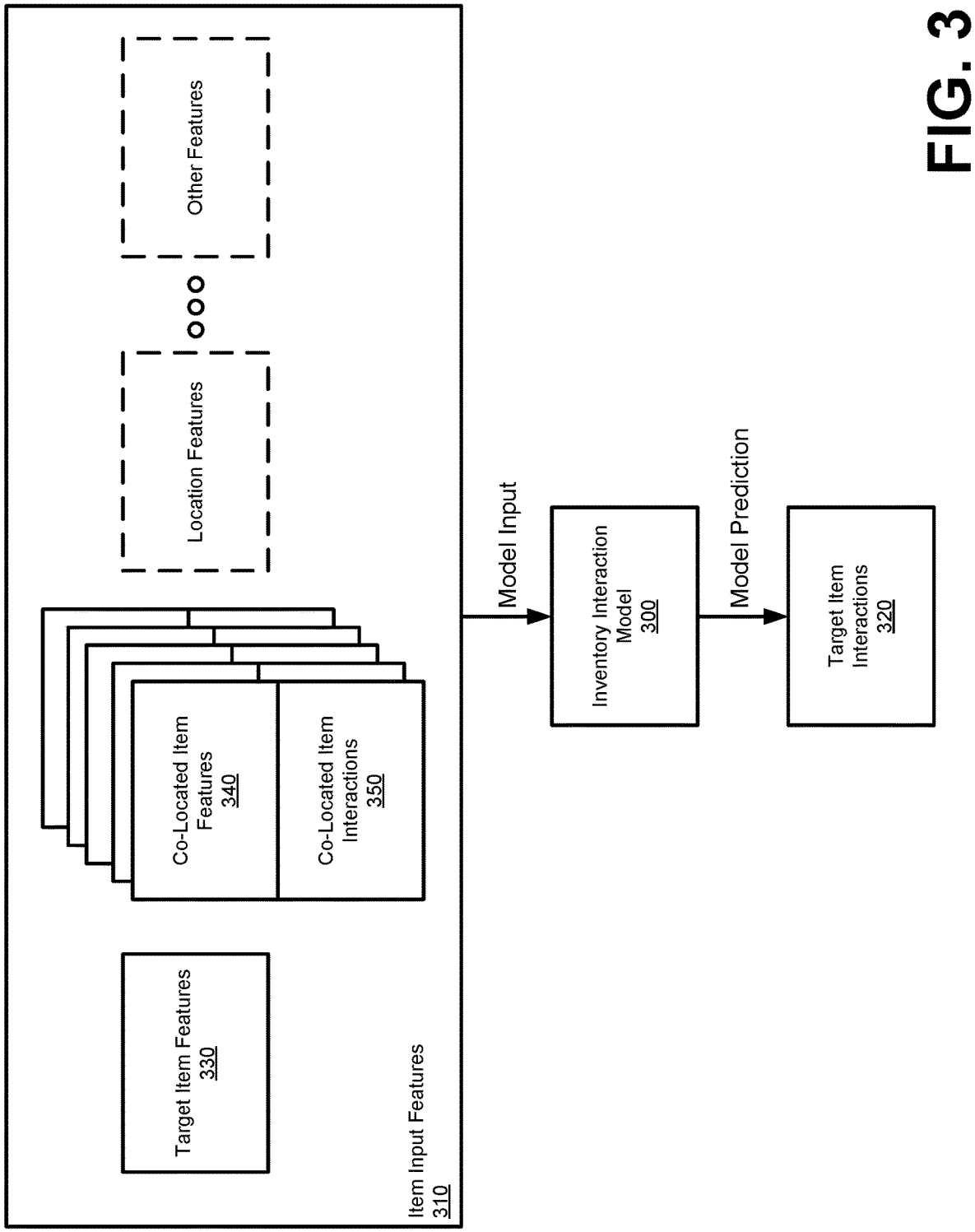
FIG. 3 shows an example structure for the inputs and output of an inventory interaction model, in accordance with one or more embodiments.

FIG. 3 shows an example structure for the inputs and output of an inventory interaction model 300, in accordance with one or more embodiments. The inventory interaction model 300 receives a set of item input features 310 with respect to a target item for which to predict one or more target item interactions 320 of users with the target item. The item input features 310 include one or more features that may describe the target item, co-located items, and other features used as inputs to the inventory interaction model 300. The inventory interaction model 300 is a machine-learning model that includes a number of parameters that together describe the processing of the item input features 310 for the generation of the target item interactions 320. The inventory interaction model 300 may be any suitable type of machine-learning model with trainable parameters and may include model types as discussed above with respect to the machine-learning training module 230. The inventory interaction model 300 thus may include various types of models and/or layers for various types of processing depending on the particular embodiment and configuration of the inventory interaction model. For example, in one or more embodiments, the item input features may be processed by one or more neural network layers that combine values for preceding layers according to respective parameters, such as weights, biases, and activations. In embodiments in which the target item interactions include more than one predicted interaction for the item, the inventory interaction model may include multiple output branches, each of which may correspond to a particular output prediction (e.g., one of the target item interactions). In some of these embodiments, the branches may share joint layers (e.g., a common backbone).

The target item interactions 320 may include different types of item interactions in various embodiments and may generally describe a number of predicted interactions by users (e.g., customers) with the item within a particular timespan, such as a day, a week, or a month. In one or more embodiments, the predicted target item interactions 320 includes a total number of orders by users for the item (e.g., through an online concierge system). Additional types of target item interactions 320 include a number of times the item is added to a shopping list, a total revenue value for orders of the item, total purchases of the item in the physical warehouse (e.g., sales at the physical warehouse that did not originate via the online concierge system), and other ways in which users may interact with the item according to various embodiments. In general, the target item interactions 320 may be used in the determination of an assortment and quantity of items stocked in the warehouse, such that the target item interactions 320 may represent aggregated interactions of users over the timespan, rather than the interactions of any particular users with the items.

As the user interactions with the online concierge system may be affected by the total item assortment, the item input features 310 includes features describing co-located items, such that the item input features 310 to the inventory interaction model 300 includes information describing the other items that will be offered alongside the target item. That is, the inventory interaction model 300 may predict the target item interactions 320 for a target item in the context of the other co-located items and the respective interactions of users with those items.

As a practical example, the co-located items and their features may represent the current assortment of items in the warehouse and the interactions of users with those items. The inventory interaction model 300 predicts, given the current assortment of items and their interactions, the performance of a specific additional item added to that assortment. The inventory interaction model 300 may aim to answer the question: "Given an assortment of 100 current items and their performance, what is the expected performance of this target item as the $101^{st}$ item in the assortment?" Thus, the item input features 310 includes a set of target item features 330 that describe the target item along with a set of features describing the co-located items.

The target item features 330 may include features determined from information about a target item. The particular structure of the target item features 330 may vary in different embodiments, and may include one or more item embeddings, categories, types, values, and so forth. In some embodiments, the target item features 330 may be based on one or more machine-learning models that process the item information according to respective parameters. In some embodiments, these parameters may be pre-trained or may be trained (or refined) in conjunction with the parameters of the inventory interaction model 300. The target item features 330 may be based on the target item's name, description, categorization, brand, and any other suitable information about the target item. In one or more embodiments, the target item's embedding is based on a natural-language processing of information about the target item, for example, by tokenizing a product's description and combining embeddings associated with the tokens.

Co-located item features 340 may similarly describe the co-located items, for example, and be generated similar to the generation of the target item features 330. For example, the co-located item features 340 may describe each co-located item as an embedding based on information about each co-located item. In some embodiments, each co-located item may be represented by its own features. Additionally or alternatively, the co-located items may be summarized or aggregated to a feature set describing aspects of the co-located items as a whole. In addition, the co-located items may also be described with features based on the item interactions of the respective co-located items. Co-located item interactions 350 may describe the interactions with each respective item or may be an aggregation or summary of the co-located items. In one example, each co-located item may thus be represented by 1) item features, such as an item embedding, and 2) interaction features, such as the number of times the item was included in an order in the relevant timespan.

In additional or alternative embodiments, rather than describing discrete items, the features describing co-located items (e.g., co-located item features 340 and co-located item interactions 350) may summarize characteristics of the co-located items as a whole. In one or more embodiments, the co-located items may be described with respect to individual categories and respective portions of overall interactions of that item category for the location. For example, a group of co-located items in the "ice cream" category may be described as being 5% of a location's inventory and representing 7% of the total user interactions for the location. The co-located items and their interactions may thus be represented in a variety of different ways in different embodiments.

The item input features 310 may include additional features that may vary in different embodiments. For example, the item input features 310 may include location features that describe the physical location at which the items are offered (and to which the target item may be evaluated for addition to the item assortment alongside the co-located items). The location features may describe, for example, the size, capacities, and other properties of the physical location.

Additional item input features 310 may also be included, such as characteristics, aspects of the local geographical environment, or climate of the physical location (e.g., a warehouse). Additional features that may be included thus may also describe the geographic location of the warehouse along with demographic information, such as the relative income levels, typical purchases, and other characteristics of the surrounding clientele of the warehouse. Additional features may also include seasonal or other timing information, or weather, climate, and other data that may affect users' interactions with the item assortment. In some embodiments, the inventory interaction model 300 may be trained with training data across multiple warehouses and across time, such that these factors may also assist in determining item assortments at different locations and at different times at which these various features may differ.

Thus, to evaluate a given item, the item input features 310 are determined based on the target item, co-located items, and other features, and are then input to the inventory interaction model 300. The inventory interaction model 300 is applied to the item input features 310 based on the model's parameters to generate the target item interactions 320. Because the target items in practice may be used as candidates for addition to the co-located items to make up an item assortment for a warehouse, the candidate items may not directly have training data describing target item interactions 320 from which the inventory interaction model 300 may be trained to effectively learn parameters. To address this challenge, training examples are constructed based on existing item information, enabling effective training of the model parameters and application of the inventory interaction model 300 to new items.

Figure 4:
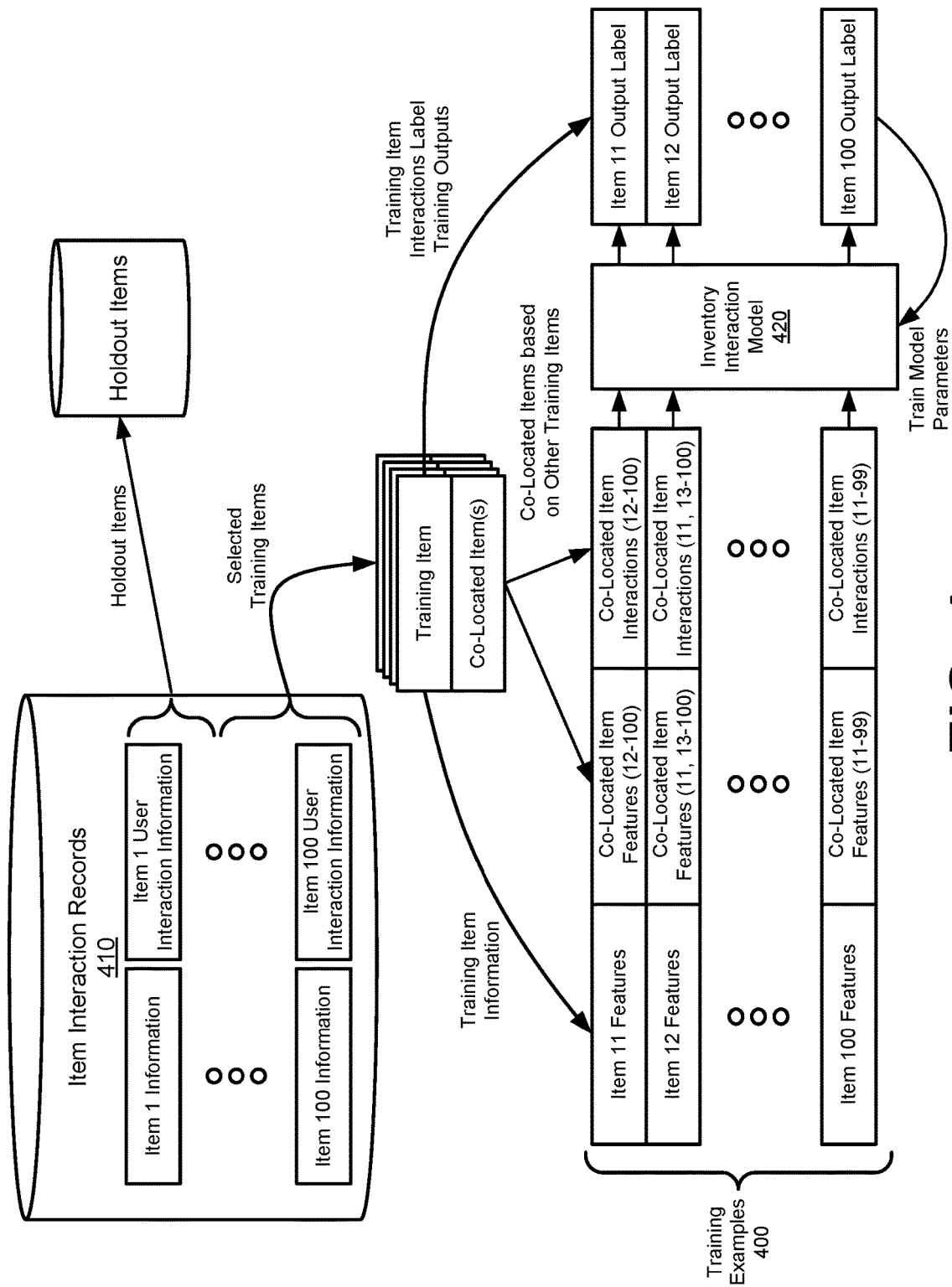
FIG. 4 shows an example of generating training examples for training an inventory interaction model, in accordance with one or more embodiments.

FIG. 4 shows an example of generating training examples for training an inventory interaction model 420, in accordance with one or more embodiments. In this example, a set of training examples 400 is generated based on a set of item interaction records 410. The item interaction records 410 are a set of information about an item assortment that was concurrently stocked at a warehouse, e.g., for a timespan to be predicted by the inventory interaction model 420. That is, the item interaction records 410 include items that may have been previously stocked together during a timespan and for which the item interactions by users are known. As such, these may represent the item assortment in which the items were actually sold together (e.g., co-located). However, although they may represent an item assortment that was actually stocked and sold together, to generate training examples while being able to perform validation of additional data with known labels, the items may be split into a set of holdout items and a set of training items.

In further detail, to form the training examples 400, a portion (e.g., a subset) of the items in the item interaction records 410 are selected to be used as a subset of training items (e.g., a "target item" for which the model predicts an output) and another set are selected to be a subset of holdout items. In this example, the first ten items (item 1 through item 10) are selected as the subset of holdout items. The remaining ninety items (item 11 through item 100) are the subset of training items used to form the training examples 400 and are available to inform the co-located item features. Although the item interaction records 410 represent historical item interactions of the items included together in an item assortment (i.e., each item is co-located with all other items in the assortment), the holdout items are removed such that the training examples 400 may be generated as though only the selected training items were included the item assortment. That is, the holdout items may be excluded from the generation of co-located item information in the co-located item features of the training examples 400. While this modifies the "true" co-located items for each training example 400 (i.e., excluding the holdout items), it also permits the holdout items to be used as validation data for the model. In addition, and as further discussed below, different subsets of items may be selected as the holdout items to generate additional training data for a model or to generate further validation scores of different models.

Each of the training examples 400 may thus relate to one of the training items, such that item 11 is one training example, item 12 is another training example, and so forth. The item features for the training examples (i.e., the target item features 330 as shown in FIG. 3) are generated based on information for each respective item, such that the first training example includes item features for the first item, and so forth. The remaining items in the subset of training items (i.e., other training items different from the selected item for the training example) are then considered as the co-located items for the training example. That is, after removing the selected items, the remaining item interaction records 410 are processed to generate features for the co-located items, which may include co-located item features (describing the items themselves) and co-located item interactions (describing user interactions with the co-located items). Any additional input features may also be added for the training examples, such as location information and any other features used in the particular embodiment.

Each training example may then be labeled with a training output based on the user interaction information of that item in the item interaction records 410, such that the model may be trained to minimize an error with respect to each item's output label (based on the actual user interactions with the item when co-located with the other co-located items).

As such, in this example, ten training examples 400 correspond to each of the training items 11 through 100, and each set of item input features for the training examples is populated with co-located item features and co-located item interactions based on the other training items (but may exclude information about the holdout items). In various configurations, different numbers or percentages of items may be selected as the holdout items and the training items. For example, the number of items selected for the training items may vary. In this example, 10% of the items were selected as holdout items and the remaining 90% were used as training items (e.g., creating a simulated item assortment of these training items); in other configurations, more or fewer items are selected (as a number or a percentage) for each subset. In one or more embodiments, a single item is selected as a holdout item and the remaining items (in this example, the remaining 99 items) are used as training items.

In some embodiments, this process is repeated to generate training examples 400, with different subsets of items in the item interaction records 410 selected as the holdout items and the training items. The different subsets may vary the particular items selected, such that different combinations of training items (having different training items considered as co-located) are used to generate the training examples 400. In some embodiments, the different selected subsets of holdout items may be mutually exclusive, such that the selected holdout items in each group of generated training examples do not overlap. For example, a first set of holdout items includes items 1-10, such that training examples are generated based on items 11-100, a second set of holdout items may include items 11-20, such that training examples may be generated with items 1-10 and 21-100, and so forth.

This may be repeated, in some embodiments, to generate different training examples based on different subsets of training items from the item interaction records 410. In some examples, the same item may be selected for generating a training example with different sets of co-located items (e.g., based on different holdout items); for example, item 32 may be used to generate a training example with co-located items 11-100 (excluding item 32) as one training example (e.g., with holdout items 1-10), and item 32 may also be used to generate another training example with co-located items 1-90 (e.g., with holdout items 91-100).

Finally, the generated training examples 400 are used to train parameters of the inventory interaction model 420 to generate predicted user interactions based on the respective output labels. That is, the parameters may be trained to reduce an error between the predicted user interactions and the output label for each training example. The inventory interaction model 420 may be trained with any appropriate machine-learning training approach, such as a gradient descent algorithm and with backpropagation of an error with respect to predicted output(s). In some embodiments, the model may be trained with all training examples as one batch. In other embodiments, the model is trained iteratively with training batches including different training examples. For example, some training examples may be generated (e.g., with training items 11-100), the model may be trained based on these training examples as a training batch, and additional training may then be performed (to further refine model parameters) on further-generated training examples. This approach may be used, for example, to generate additional training examples and perform another training iteration based on the performance of the previous training round. In some embodiments, additional training may be performed (i.e., further training examples generated followed by further model training) based on the performance (e.g., a validation score) of the model for the preceding training iteration. Together, this approach allows the item interaction records 410 to be used to create training data and train a model to effectively simulate the addition of an item to a group of already-stocked items in a warehouse, despite that actual user interaction data for those items may not exist for training the model.

Figure 5:
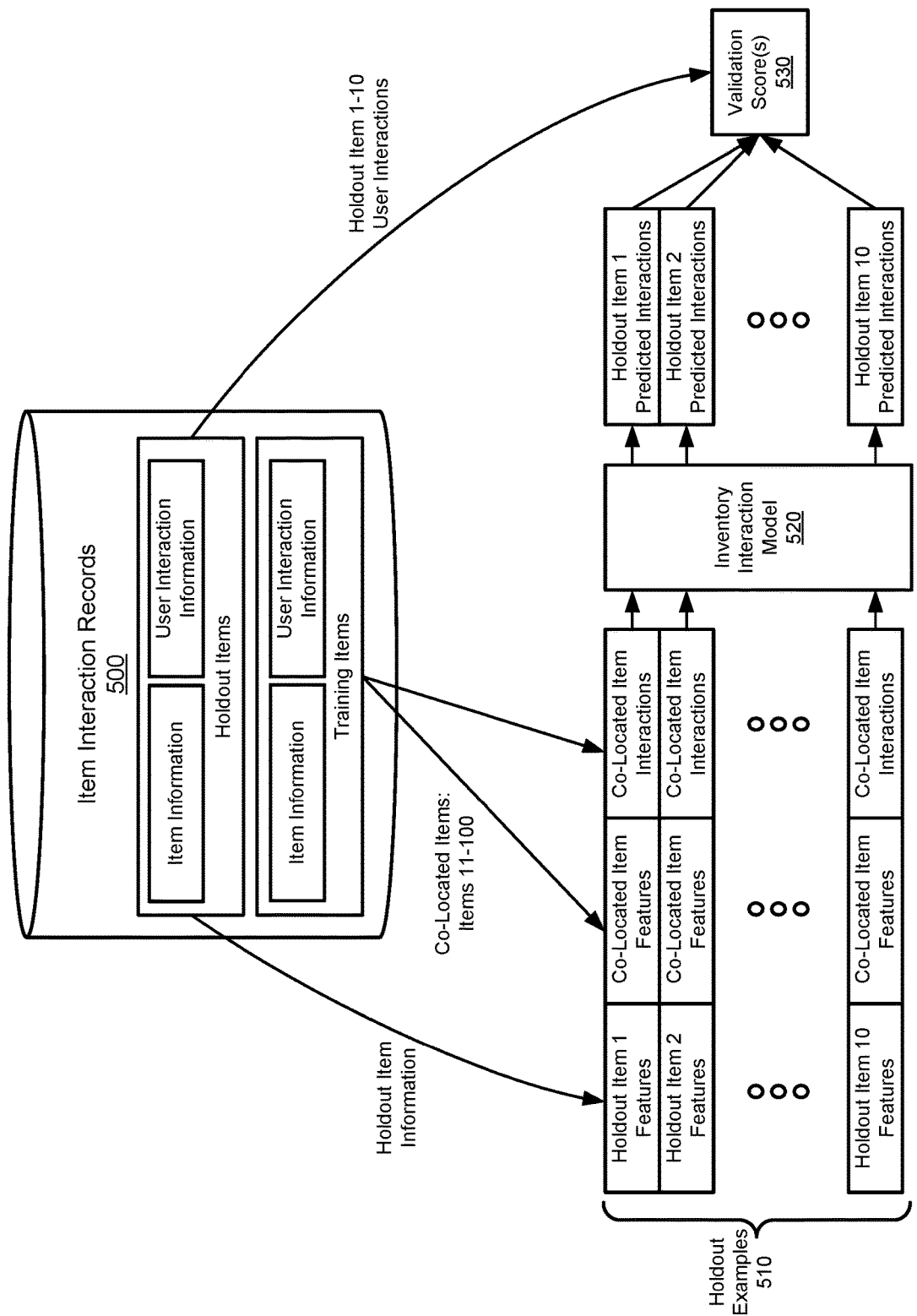
FIG. 5 shows an example for using holdout items to validate an inventory interaction model, in accordance with one or more embodiments.

FIG. 5 shows an example for using holdout items to validate an inventory interaction model 520, in accordance with one or more embodiments. As discussed with respect to FIG. 4, the inventory interaction model 520 may be trained based on training examples formed with information about a subset of training items with another set of holdout items excluded from inclusion as holdout items (i.e., creating an item assortment for training items that excludes the holdout items). The holdout items may be used to generate a validation score 530 of the trained model with respect to the holdout items. The item interaction records 500 may include a subset of training items used to generate the training examples that trained the model and a set of holdout items. As the holdout items are associated with known user interaction information but were not included with respective feature vectors in the data for training the model, they may be used to evaluate the effectiveness of the model based on the known data for the user interactions. That is, the known user interaction data for the training items was used during training to generate training and modify parameters of the model; the known user interaction data for the holdout items may be used to evaluate the performance of the trained model on previously-unseen data. As such, item information for each holdout item may be used to generate a feature vector for a respective holdout example 510. A trained inventory interaction model 520 may be applied to each set of features to generate predicted user interactions for each example.

The user interaction prediction from the inventory interaction model 520 may then be compared with the known user interaction information of the respective holdout item (e.g., from the item interaction records 500) to generate a validation score 530. The validation score 530 may represent the effectiveness of the trained inventory interaction model 520 with respect to the known user interactions for the holdout items. In some embodiments, the validation score 530 is a combination (e.g., a sum) of the difference in predicted user interactions relative to the known user interactions. In further embodiments, the validation score 530 may be a more detailed cost function or other evaluation of the error. For example, the error of user interactions may have different practical effects on the physical warehouse based on the requirements or costs of mistakenly predicting user interactions. Errors in predicting user interactions for items that require a relatively large storage space, for example, may introduce higher costs than items that require relatively low storage space, and the cost function may thus relatively increase costs (in the validation score) for errors of high-storage items and decrease costs for relatively low-storage items. Many other types of costs may be considered in the validation score, including characteristics of the items (e.g., with respect to physical warehouses), as well as model and other training-aware costs.

The validation score 530 may then be used to determine further actions for the trained inventory interaction model 520, such as whether to accept the model for further use in evaluating candidate items, to further train the model, or to reject the model for further use (e.g., to consider another inventory interaction model structure that may have superior performance). In some embodiments, the validation score 530 is compared to a threshold to determine whether to perform one of these actions.

In additional or alternative embodiments, a particular inventory interaction model (e.g., a particular model architecture, such as a number of model layers, input feature configuration and structure, and so forth) may be trained with different training subsets and different holdout subsets. A validation score 530 may be generated with respect to each training subset and each respective holdout set to generate a total validation score 530 representing the performance of that inventory interaction model with respect to different holdout items. This may provide a validation score 530 reflecting cross-validation of the model architecture across a variety of different training items to a variety of different holdout items and may provide a score indicating whether model performance is relatively robust across different training and holdout data.

Finally, in some embodiments, the validation score 530 may be used to evaluate and compare different models (e.g., model architectures) for selecting a preferred model architecture for further use. As such, in one or more embodiments, a group of different model architectures may be trained on training items and evaluated with holdout items to determine respective validation scores 530. The validation scores 530 may also include evaluation of models on different groups of holdout items (e.g., based on further training item subsets). For example, the models may be trained on items 11-100 and validated with holdouts 1-10, trained with items 1-10, 21-100 and validated with holdouts 11-20, and so forth to determine a validation score 530 with different holdout items. By comparing the validation scores 530 (e.g., which may be determined by cross-validation using different holdout groups), the different models (e.g., model and/or feature architectures or training algorithms) may be compared and the best-performing model, as measured by the validation score 530, may be selected. The selected model may then be further trained or used for evaluation of candidate items.

In one embodiment, after selecting a model to be used (e.g., a model architecture), the model may be re-trained based on a complete set of item interactions. That is, while the holdout items may be used to simulate an item assortment for co-located items, it may cause some error due to the removal of the holdout items. After selecting a model for use (i.e., the model is validated to effectively predict user interactions), training data may be generated with all items used as training items. In the example above with one hundred items, each of the one hundred items may be used as a training example with the other ninety-nine items considered co-located items. The model may then be trained based on the complete data set (i.e., all items in item interaction records 410/500) without the potential distortion caused by the removal of holdouts on the co-located item features. In sum, in some embodiments the holdouts may be used to evaluate candidate models, select a candidate model, and further train the selected candidate model on the set of items in the item inventory without holdouts.

Figure 6:
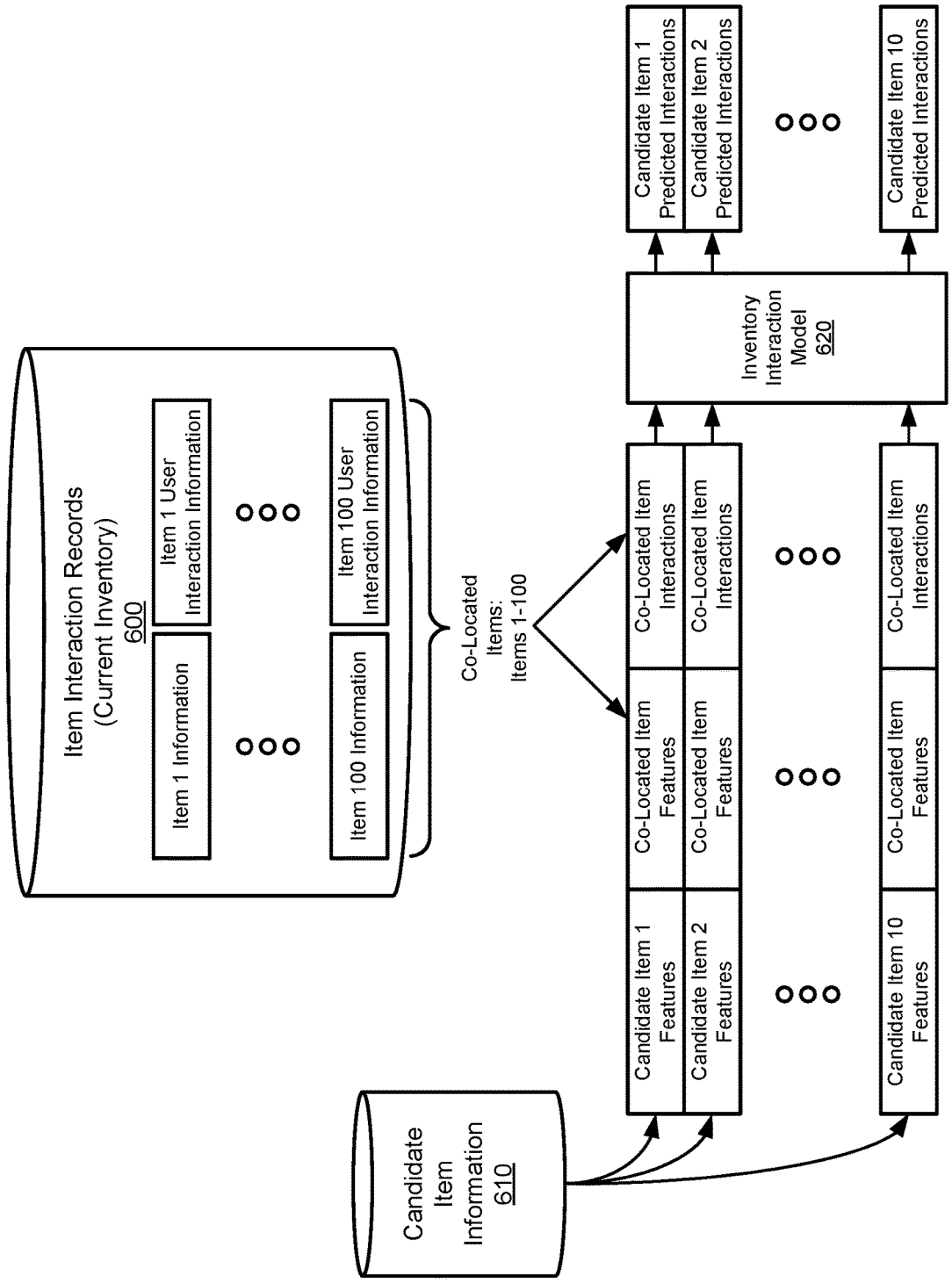
FIG. 6 shows an example of applying an inventory interaction model to candidate items, in accordance with one or more embodiments.

FIG. 6 shows an example of applying an inventory interaction model 620 to candidate items, in accordance with one or more embodiments. After training, the inventory interaction model 620 may then be used to evaluate a candidate item for addition to a physical warehouse by predicting user interactions with the item. The current item inventory of the warehouse and user interactions with items are stored as a set of item interaction records 600. The item interaction records 600 may include, for example, the set of items that are currently available at the warehouse, and user interactions, such as purchase frequency, associated with the items. In some embodiments, the items used in the item interaction records 600 are included in the set of items from which training examples were generated and used to train the inventory interaction model 620.

To apply the model, item input features are generated for each of the candidate items. The item input features include the co-located item features and co-located item interactions based on the current inventory (e.g., the item interaction records 600). The co-located item features may thus summarize the current inventory, which in this example, are represented as co-located items 1-100 and may be the same for each set of item input features of the various candidate items. Features describing each candidate item are included as candidate item features based on a set of candidate item information 510, along with any additional features (e.g., location features), and are used as the item input features for the respective candidate items. The input item features are applied to the parameters of the inventory interaction model 620 to generate respective predicted interactions for the candidate items. Using the predicted interactions, the items may then be further scored and/or ranked to select items for addition to the co-located items.

Figure 7:
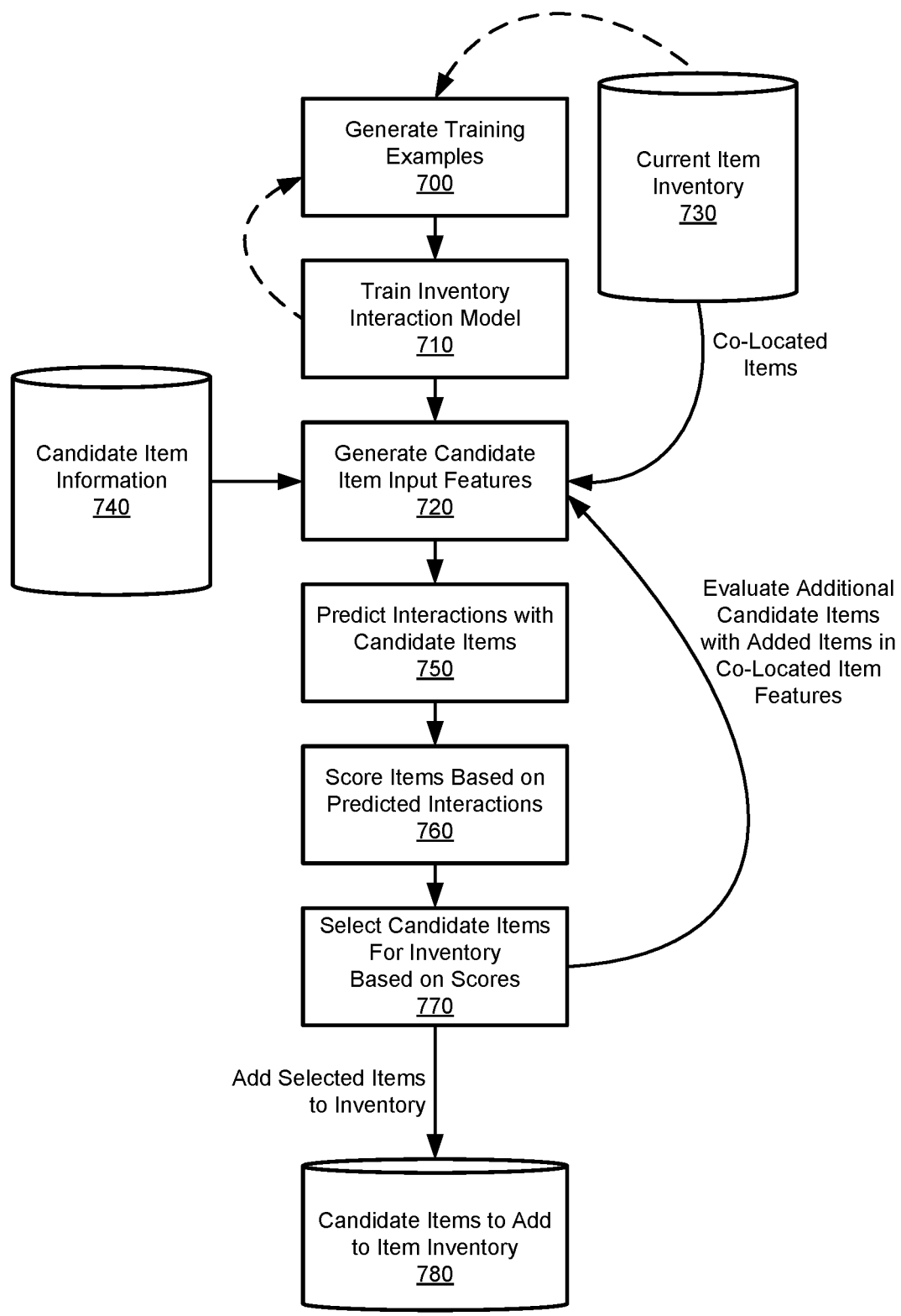
FIG. 7 is a flowchart for a method of training an inventory interaction model and using the inventory interaction model for selecting items for an item inventory, in accordance with one or more embodiments.

FIG. 7 is a flowchart for a method of training an inventory interaction model and using the inventory interaction model for selecting items for an item inventory, in accordance with one or more embodiments. Additional or alternative embodiments may include more, fewer, or different steps from those illustrated in FIG. 7, and the steps may be performed in a different order from that illustrated in FIG. 7. These steps may be performed by an online concierge system (e.g., online concierge system 140). Additionally, each of these steps may be performed automatically by the online concierge system without human intervention.

Initially, training examples are generated 700 based on item assortments and user interactions. As discussed above, the training examples may be generated based on a current item inventory 730, for example, by selecting a portion of the items as the training examples. In some embodiments, the training examples may also include training data and examples from historical item inventory relating to the warehouse at which candidate items may be added, and further training examples to train the model may also be included from item inventory related to other warehouses. Including additional training examples may also assist in preventing the model from overfitting the current inventory and conditions of a particular warehouse, while also allowing learning from data of other warehouses and in other conditions (e.g., other locations, seasons, other clientele, etc.). The particular training data for a given group of items and item interactions may be generated as discussed above (e.g., with respect to FIG. 4). That is, each training example may include features of the co-located items and related interactions for that particular item assortment and associated interactions. The training examples for a particular timespan (and a particular location) may also be separated into training items and holdout items, such that the "co-located" items during training may exclude the holdout items as discussed above. The training examples may then be used to train 710 the inventory interaction model, which may include iterative generation of training examples and further training. In addition, additional sets of training examples may be generated with different holdouts, and one or more validation scores may be generated to evaluate and/or select a machine-learned model to be used and/or further trained.

To use the inventory interaction model, items co-located with a set of candidate items are identified from candidate item information 740 and current item inventory 730 to generate candidate item input features 720 as discussed above (e.g., with respect to FIG. 6). In some embodiments, the co-located items may be the actual current inventory of the warehouse at which the candidate items will be stocked (for example, when the candidate items are considered for addition to a current item assortment). Additionally or alternatively, the co-located items used for evaluation of the candidate items may be a modification of the items currently stocked in the warehouse. For example, the current item assortment of the warehouse may be evaluated to determine items to remove from the warehouse (such as poorly-performing items), such that the candidate items are considered for replacement of these poorly-performing items. In other instances, the removed items may be seasonal items, items that are no longer available, items out of stock, or other reasons that the co-located items may be modified to reflect the future assortment of items that the candidate items may be stocked with. As such, the "co-located" items may represent the items that will remain in the warehouse, and thus the candidate items are evaluated with respect to these remaining items as the "co-located" items in the item input features.

After the candidate item input features are generated 720, the inventory interaction model is applied to predict 750 interactions with the respective candidate items. The predictions may include, for example, the number of orders for the item and so forth, according to the particular interactions used to train 710 the inventory interaction model. In some embodiments, the candidate items may be further scored 760 based on the predicted interactions. For example, in embodiments in which the prediction relates to the number of items ordered by users, the scoring may further evaluate features based on the number of items ordered, such as an amount of warehouse space taken by stock of the item, a total revenue for the item, whether the item has any special requirements to be stocked at the warehouse (e.g., frozen items that require available freezer space), and so forth. Certain items with a high predicted interaction rate may occupy a relatively high amount of storage space and provide a relatively low profit margin, while other items with a low predicted interaction rate may occupy low storage space with a high profit margin. In some embodiments, the scoring 760 may thus incorporate these additional factors to determine a total score across which items may be compared.

Using the predicted interactions (and/or scoring), a candidate item may be selected 770 to be added to the item inventory 780. In some embodiments, the candidate items may be selected by ranking the items according to the predicted interactions and/or score, and a number of top-ranked candidate item(s) are selected for addition to the inventory. In embodiments in which more than one candidate item can be selected for addition to the inventory, in some configurations, the candidate items may be selected with iterative evaluation and addition of the items. This iterative evaluation and addition of items may be used to account for item-item effects for the candidate items. That is, the addition of one candidate item to the inventory may affect the predicted interactions of another candidate item, as items may constructively or destructively affect purchases of other co-located items. As such, in some embodiments, one or more items are selected for addition to the inventory; and to evaluate further items, these candidate items are added to the co-located items in the item input features for re-evaluating other candidate items. The added candidate items may be added to the co-located items with the predicted interactions of the added items, such that the co-located items for further evaluation reflect an item assortment that includes the added item.

As an example, a current item assortment of 100 items may be used as the co-located items to generate item input features for evaluating 10 candidate items. After predicting user interactions and scoring the 10 candidate items, one item is selected for addition to the item assortment. To re-evaluate the remaining 9 candidate items with consideration of the added item, the item input features for the 9 candidate items are updated to include the added candidate item as one of the co-located items with the current inventory using the predicted item interactions of the added item. That is, the co-located items used for the item input features may include the 100 items in the current item assortment and the added candidate item. The user interactions may then be re-predicted 750 based on the updated co-located item input features, and another candidate item set is selected for addition. This may be repeated until a condition for selecting candidate items is satisfied, such as reaching an item or storage capacity of a warehouse. By re-calculating the co-located item input features with the added item(s) and thus iteratively evaluating and adding candidate items, the item-item interactions for added candidate items may be effectively addressed in using the model. This may prevent, for example, the addition of multiple candidate items that may be substitutes for one another and thus negatively interfere with the predicted interactions.

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine learning models in the performance of their described functionalities. A "machine-learning model," as used herein, comprises one or more machine-learning models that perform the described functionality. Machine-learning models may be stored on one or more computer-readable media with a set of weights. These weights are parameters used by the machine-learning model to transform input data received by the model into output data. The weights may be generated through a training process, whereby the machine-learning model is trained based on a set of training examples and labels associated with the training examples. The training process may include: applying the machine-learning model to a training example; comparing an output of the machine-learning model to the label associated with the training example; and updating weights associated for the machine-learning model through a back-propagation process. The weights may be stored on one or more computer-readable media and are used by a system when applying the machine learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or". For example, a condition "A or B" is satisfied by any one of the following: A is true (or present) and B is false (or not present); A is false (or not present) and B is true (or present); and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method, performed at a computer system comprising a processor and a computer-readable medium, comprising:
identifying a plurality of items offered at a physical warehouse during a timespan, each item associated with interaction data of users with the respective item in the timespan;
generating a training data set of training data examples by:
identifying a subset of holdout items from the plurality of items;
selecting a subset of training items from the plurality of items, the subset of training items being different from the subset of holdout items;
identifying a set of co-located items for each item in the subset of items, including other items in the subset of training items and excluding the subset of holdout items;
for each item in the subset of training items, determining training input features including item features of the item and co-located item features based on the set of co-located items and interaction data associated with the co-located items;
labeling each item in the subset of training items based on interaction data of the users with the item, wherein labeling an item based on interaction data indicates whether the users included the item in an order; and
including the training input features and labels for the subset of training items in the training data set as the training data examples;
training a machine-learning inventory interaction model to predict user interactions for an item based on the training data set;
identifying a candidate item for application to the inventory interaction model;
determining that the identified candidate item is an item that lacks sufficient training data describing interactions with the candidate item to effectively learn parameters for the inventory interaction model;
identifying a set of candidate co-located items that are co-located in the physical warehouse with the candidate item;
applying the machine-learning inventory interaction model to predict user interactions for the candidate item, wherein applying the machine-learning inventory interaction model comprises applying the machine-learning inventory interaction model to features describing the identified set of candidate co-located items; and
selecting the candidate item for addition to the set of candidate co-located items based on the predicted user interactions for the candidate item.

2. The method of claim 1, the method further comprising:
generating a validation score by applying the machine-learning inventory interaction model to the subset of holdout items.

3. The method of claim 2, wherein applying the machine-learning inventory interaction model to the subset of holdout items includes generating co-located item features for one or more holdout items based on the subset of training items.

4. The method of claim 1, the method further comprising:
generating additional training data examples with a different subset of training items.

5. The method of claim 1, wherein the training input features includes location features of the physical warehouse.

6. The method of claim 1, wherein the co-located item features describe user interactions with the candidate co-located items.

7. The method of claim 1, the method further comprising:
applying the machine-learning inventory interaction model to predict user interactions for a second candidate item co-located with the candidate item and the set of candidate co-located items.

8. The method of claim 1, wherein the candidate co-located items are the plurality of items offered at the physical warehouse.

9. The method of claim 1, wherein the candidate item is not one of the plurality of items offered at the physical warehouse.

10. A non-transitory computer-readable storage medium having instructions encoded thereon that, when executed by a processor, cause the processor to perform steps, comprising:
identifying a plurality of items offered at a physical warehouse during a timespan, each item associated with interaction data of users with the respective item in the timespan;
generating a training data set of training data examples by:
identifying a subset of holdout items from the plurality of items;
selecting a subset of training items from the plurality of items, the subset of training items being different from the subset of holdout items;
identifying a set of co-located items for each item in the subset of items, including other items in the subset of training items and excluding the subset of holdout items;
for each item in the subset of training items, determining training input features including item features of the item and co-located item features based on the set of co-located items and interaction data associated with the co-located items;
labeling each item in the subset of training items based on interaction data of the users with the item, wherein labeling an item based on interaction data indicates whether the users included the item in an order; and
including the training input features and labels for the subset of training items in the training data set as the training data examples;
training a machine-learning inventory interaction model to predict user interactions for an item based on the training data set;
identifying a candidate item for application to the inventory interaction model;
determining that the identified candidate item is an item that lacks sufficient training data describing interactions with the candidate item to effectively learn parameters for the inventory interaction model;
identifying a set of candidate co-located items that are co-located in the physical warehouse with the candidate item;
applying the machine-learning inventory interaction model to predict user interactions for the candidate item, wherein applying the machine-learning inventory interaction model comprises applying the machine-learning inventory interaction model to features describing the identified set of candidate co-located items; and selecting the candidate item for addition to the set of candidate co-located items based on the predicted user interactions for the candidate item.

11. The non-transitory computer-readable storage medium of claim 10, the instructions further causing the processor to perform steps comprising:

generating a validation score by applying the machine-learning inventory interaction model to the subset of holdout items.

12. The non-transitory computer-readable storage medium of claim 11, wherein applying the machine-learning inventory interaction model to the subset of holdout items includes generating co-located item features for one or more holdout items based on the subset of training items.

13. The non-transitory computer-readable storage medium of claim 10, the instructions further causing the processor to perform steps comprising:

generating additional training data examples with a different subset of training items.

14. The non-transitory computer-readable storage medium of claim 10, wherein the training input features includes location features of the physical warehouse.

15. The non-transitory computer-readable storage medium of claim 10, wherein the co-located item features describe user interactions with the candidate co-located items.

16. The non-transitory computer-readable storage medium of claim 10, the instructions further causing the processor to perform steps comprising:

applying the machine-learning inventory interaction model to predict user interactions for a second candidate item co-located with the candidate item and the set of candidate co-located items.

17. The non-transitory computer-readable storage medium of claim 10, wherein the candidate co-located items are the plurality of items offered at the physical warehouse.

18. A system comprising;
a processor; and
a non-transitory computer readable storage medium having instructions encoded thereon that, when executed by the processor, cause the processor to perform steps comprising:

identifying a plurality of items offered at a physical warehouse during a timespan, each item associated with interaction data of users with the respective item in the timespan;

generating a training data set of training data examples by:

identifying a subset of holdout items from the plurality of items;

selecting a subset of training items from the plurality of items, the subset of training items being different from the subset of holdout items;

identifying a set of co-located items for each item in the subset of items, including other items in the subset of training items and excluding the subset of holdout items;

for each item in the subset of training items, determining training input features including item features of the item and co-located item features based on the set of co-located items and interaction data associated with the co-located items;

labeling each item in the subset of training items based on interaction data of the users with the item, wherein labeling an item based on interaction data indicates whether the users included the item in an order; and including the training input features and labels for the subset of training items in the training data set as the training data examples;

training a machine-learning inventory interaction model to predict user interactions for an item based on the training data set;

identifying a candidate item for application to the inventory interaction model;

determining that the identified candidate item is an item that lacks sufficient training data describing interactions with the candidate item to effectively learn parameters for the inventory interaction model;

identifying a set of candidate co-located items that are co-located in the physical warehouse with the candidate item;

applying the machine-learning inventory interaction model to predict user interactions for the candidate item, wherein applying the machine-learning inventory interaction model comprises applying the machine-learning inventory interaction model to features describing the identified set of candidate co-located items; and selecting the candidate item for addition to the set of candidate co-located items based on the predicted user interactions for the candidate item.

* * * * *